(12) United States Patent
Ko et al.

(10) Patent No.: US 9,336,621 B2
(45) Date of Patent: May 10, 2016

(54) METHOD AND APPARATUS FOR PLAYING AN ANIMATION IN A MOBILE TERMINAL

(71) Applicant: Samsung Electronics Co., Ltd., Gyeonggi-do (KR)

(72) Inventors: Daehyun Ko, Seoul (KR); Junegeol Kim, Gyeonggi-do (KR); Heeseon Park, Seoul (KR); Artem Kozlov, Gyeonggi-do (KR); Sunghyun Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 295 days.

(21) Appl. No.: 13/760,791

(22) Filed: Feb. 6, 2013

(65) Prior Publication Data

US 2013/0201194 A1 Aug. 8, 2013

(30) Foreign Application Priority Data

Feb. 8, 2012 (KR) .................. 10-2012-0012847

(51) Int. Cl.
*G06T 13/00* (2011.01)
*G06F 3/0487* (2013.01)

(52) U.S. Cl.
CPC .............. *G06T 13/00* (2013.01); *G06F 3/0487* (2013.01)

(58) Field of Classification Search
USPC .................................................. 345/419, 473
See application file for complete search history.

(56) References Cited

U.S. PATENT DOCUMENTS

| 2002/0140666 A1 | 10/2002 | Bradski |
| 2010/0083191 A1 | 4/2010 | Marshall |
| 2011/0041086 A1 | 2/2011 | Kim et al. |
| 2011/0193788 A1* | 8/2011 | King et al. .................... 345/173 |
| 2011/0193867 A1 | 8/2011 | Ahn et al. |
| 2011/0216076 A1 | 9/2011 | Kim et al. |

FOREIGN PATENT DOCUMENTS

| KR | 1020070029330 | 3/2007 |
| KR | 1020110017188 | 2/2011 |
| WO | WO 2010/033523 | 3/2010 |

* cited by examiner

*Primary Examiner* — Kimbinh T Nguyen
(74) *Attorney, Agent, or Firm* — The Farrell Law Firm, P.C.

(57) ABSTRACT

A method and apparatus are provided for playing an animation in a mobile terminal. The method includes displaying content; determining an object of an animation from the content; determining whether an interaction event occurs while displaying the content; and playing an animation of the determined object, when the interaction event occurs.

13 Claims, 14 Drawing Sheets

[a]

[b]

CHANGE OF GRAVITY DIRECTION

FIG. 8

[a]
- 800 ENVIRONMENT SETTING SCREEN
- 810 WIRELESS NETWORK
- 820 LOCATION SERVICE
- 830 SOUND
- 840 DISPLAY
- 850 SECURITY
- 860 ANIMATION

[b]
- 860 ANIMATION
- 861 PHYSICAL ATTRIBUTE
- 862 COLLISION ATTRIBUTE
- 863 CONSTRAINT
- 864 INTERACTION EVENT
- 865 PLAYBACK TIME
- 866 STATIC/DYNAMIC

[c]
- 861 PHYSICAL ATTRIBUTE>>RIGID BODY
- 8611 WEIGHT
- 8612 DAMPING COEFFICIENT
- 8613 FRICTION EFFICIENT
- 8614 STRENGTH
- 8615 FORCE
- 8616 ELASTIC FORCE

FIG. 9

```
function initPhysics ( )
{
    scenario = new    SLPdeviceapis.Physics.Scenario ( ) ;

var  world = new    SLPdeviceapis.Physics.World ( ) ;        ~910
    world.setGravity[0, -50,0] ) ;
    scenario.addObject (world) ;

var  sphere = new    SLPdeviceapis.Physics.CollisionShapes.SphereShape ( ) ;    ~930
    sphere.setRadius [10] ;

sphereRB = new    SLPdeviceapis.Physics.PhysicsObjects.RigidBody ( ) ;    ~920
    sphereRB.setShape [sphere] ;
    sphereRB.setMass [1] ;
    sphereRB.setPosition [ [0,10,0] ] ;
    world.addObject [sphereRB] ;

...
} function initPhysics [ ]
{
    scenario.update ( ) ;

var   spMat = sphereRB.getTransform ( ) ;
    mat4.set [spMat, mMatrix] ;
}
```

FIG. 10

```
<! doctype html >
<html >
<head>
    <script src="physics_util.js" ></script>
</head>
<body>
    < div id="content">
        <span style="marain: 0 4px;"><button id="btnG" class="dynamic">Search</butt
        <p> <span class="static" style="background-color: #FFFF00">Tracks your dai
            <span class="dynamic"> the same</span><span class="dynamic"> in</span><span
            <span class="dynamic"> in</span><span class="dynamic"> your</span><span cla
            <span class="dynamic"> never</span><span class="dynamic"> knew</span><span
        <p>
            <img class="dynamic"   src="5151dc5f7076485b1b7d74ab30a8d596.png"/>
        </p>
        <p><span class="dynamic">A</span><span class="dynamic"> number</span><
            <span class="dynamic"> about:me</span><span class="dynamic"> are</span
            <span class="dynamic"> we</span><span class="dynamic"> can</span><span
        </p>
        <p>
            <img class="dynamic" src="3fc32b64980fc596b4f6f59fad6fd689.png"/>
        </p>
    </div>
</body>
</html>
```

1020 — `<script src="physics_util.js" ></script>`

`<span class="static">`

1010 — `<img class="dynamic"`

METHOD AND APPARATUS FOR PLAYING AN ANIMATION IN A MOBILE TERMINAL

PRIORITY

This application claims priority under 35 U.S.C. §119(a) to Korean Patent Application Serial No.10-2012-0012847, which was filed in the Korean Intellectual Property Office on Feb. 8, 2012, the entire disclosure of which is hereby incorporated by reference.

BACKGROUND OF THE INVENTION

1. Field of the Invention

The present invention relates generally to a method and an apparatus for playing an animation in a mobile terminal, and more particularly, to a method and apparatus for playing an animation with respect to various web content in a web browser and a web application.

2. Description of the Related Art

A mobile terminal may be a necessity in modern people. That is, the mobile terminal is used regardless of age or sex, and has been used as a medium capable of performing wireless audio call and information exchange. In initial supply of the mobile terminal, the mobile terminal is recognized that it is simply carried and allows a user to perform a wireless call. With the development of technology, the mobile terminal provides various services and functions. For example, the mobile terminal is developed to a multi-media device capable of performing a phone book function, a morning call function, a music player function, a schedule management function, a digital camera function, and a wireless Internet service and provides various services.

Meanwhile, the web page is a document defined by a Hyper Text Markup Language (HTML) specification. A body of the web page may include various web contents such as image, moving images, and audios as well as texts. The web contents are suitably arranged in an HTML document by a tag associated with a layout to configure a web page. An initial HTML specification may configure only a static web page. In recent years, the HTML specification has been expanded for configuring a dynamic web page by using techniques such as Java Script and Cascading Style Sheets (CSS). For example, the recent HTML5 specification now supports web content without a separate plug-in, and allows a user to directly use various functions included in a mobile terminal.

Generally, to display a web page on a screen, a web browser reads outs an HTML document in order to load necessary resources. The web browser parses the loaded resources to configure a Document Object Model (DOM) tree and a render tree. The web browser performs a layout operation and a painting operation with respect to respective web content included in the HTML document to make a web page, and then displays the web page on the screen.

However, an existing supported animation of web content has limitations.

For example, a key frame scheme is a technology for disclosing the animation of web content. The key frame scheme may express a dynamic animation with respect to the web content. However, because a motion pattern of the web content is fixed, the key frame scheme is not realistic. For example, the web content performs a reciprocating motion in a landscape direction or rotates clockwise around one point. Further, a scale of the web content is restrictive.

Accordingly, it takes great effort to produce a complicated animation, and it is difficult to express real motion. Further, it is difficult to provide a collided animation from moving objects.

While Java Script extends a range of expressing animation, for a contents manufacturer, cost and time are increased in order to make various animations using Java Script.

In addition, a technique for generating and playing an animation of web content in response to external input information has not yet been provided.

SUMMARY OF THE INVENTION

The present invention has been made in view of the above problems, and provides at least the advantages described below.

An aspect of the present invention is to provide an actual animation of web content in a mobile terminal.

Another aspect of the present invention is to provide animation of web content in response to external input information.

In accordance with an aspect of the present invention, a method is provided for playing an animation in a mobile terminal. The method includes displaying content; determining an object of an animation from the content; determining whether an interaction event occurs while displaying the content; and playing an animation of the determined object, when the interaction event occurs.

In accordance with another aspect of the present invention, an apparatus is provided for playing an animation in a mobile terminal. The apparatus includes a display unit that displays content; and a controller that control the content to be displayed, determines an object of an animation from the content, determines whether an interaction event occurs while displaying the content, and plays an animation of the determined object when the interaction event occurs.

In accordance with another aspect of the present invention, a method is provided for playing an animation in a mobile terminal. The method includes determining static presence with content; determining an object of an animation from the content; and playing the animation of the determined object. The animation maintains the animation object in a static state in a fixed location, when the animation object is static.

BRIEF DESCRIPTION OF THE DRAWINGS

The above and other aspects, features, and advantages of certain embodiments of the present invention will become more apparent from the following detailed description in conjunction with the accompanying drawings, in which:

FIG. 8 illustrates examples of screens for setting different functions of a mobile terminal according to an embodiment of the present invention;

FIG. 9 illustrates an example of a web Application Programming Interface (API) according to an embodiment of the present invention;

FIG. 10 illustrates an example of an HTML document according to an embodiment of the present invention.

The same reference numbers are used throughout the drawings to refer to the same or like parts.

DETAILED DESCRIPTION OF EXEMPLARY EMBODIMENTS

Figure 1:
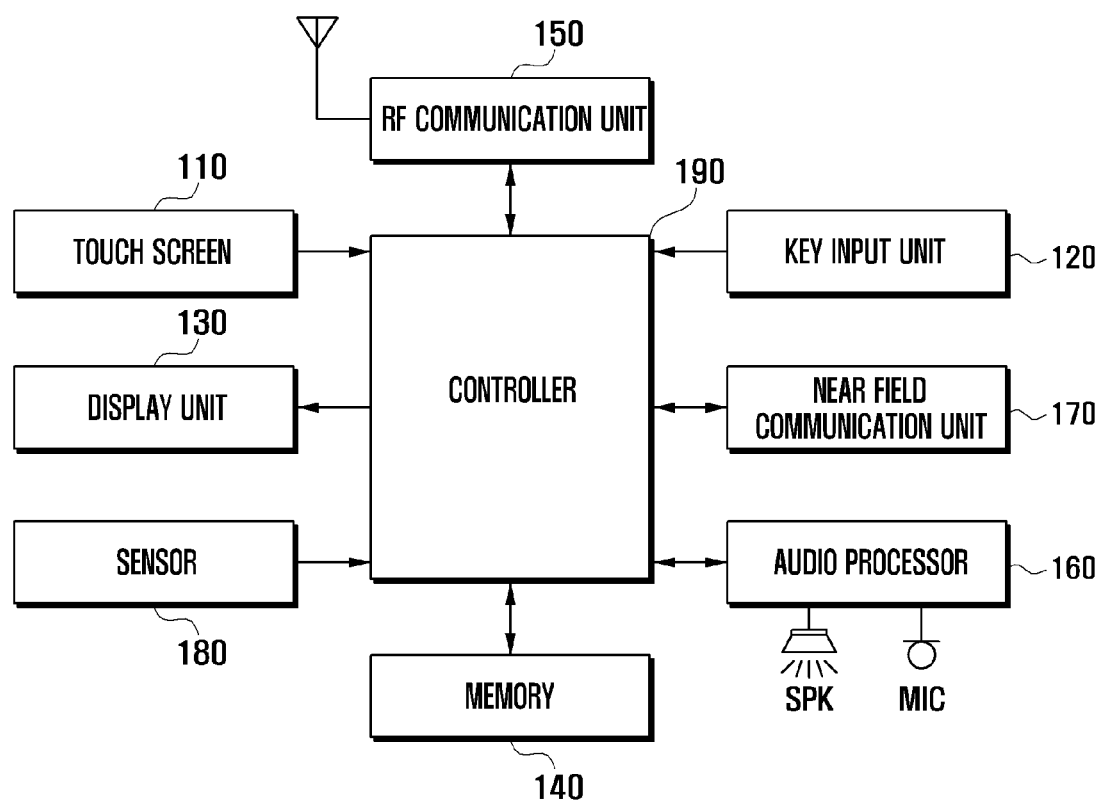
FIG. 1 is a block diagram illustrating a mobile terminal according to an embodiment of the present invention.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Objects exist in one of three phases; solid, liquid, and gas, according to temperature and pressure. Liquids and gases are generally referred to as fluids. By applying external force to a rigid solid, it is possible to classify the solid as a rigid body, a deformable body, or a soft body, based on the rigid solid's reaction to the external force. The rigid body may be expressed through rigid body dynamic simulation, and the deformable body or the soft body may be expressed by deformable body dynamic simulation. The fluid may be expressed through fluid dynamic simulation. However, because calculations for the fluid dynamic simulation are complicated, this often causes performance problems. Accordingly, instead, the fluid is often expressed by a schematic scheme called a particle system. Because the calculations in the particle system are much simpler, the particle system is widely used in real time programs, such as video games.

All animations may be 'dynamic', but 'Static' is an expression that is applicable to only a rigid body that does not move. A motionless flag (deformable body or soft body) or a stagnant pool (fluid) is not expressed as being static, but as being balanced. That is, when an external force is applied to the motionless flag (deformable body or soft body) or the pool (fluid), it may be switched to a 'dynamic' state, wherein the flag or pool moves.

Although an external force may be applied to a rigid body in a 'static' state, the rigid body may not move at all. That is, the rigid body is not switched to the 'dynamic' state. For example, a falling ball is a 'rigid body' in the 'dynamic' state, and a ball resting on the ground is a 'rigid body' in the 'balanced' state. The ground is a 'rigid body' in a 'static' state, and a flag streaming in the wind is a 'deformable body' in the 'dynamic' state. For example, a motionless flag is a 'deformable body' in the 'balanced' state, flowing water is a 'fluid' in the 'dynamic' state, and stagnant water is the 'fluid' in a 'balanced' state.

A constraint or a limitation condition is a condition that restricts motion of an object during simulation calculations. For example, for a revolving door, a constraint is added that restricts the 'rigid body', i.e., a 'door', to be rotated based on a specific axis.

Further, a constraint may be added in clothes hung by a clothes pin, where a specific location of the 'deformable body' is attached to a clothes line. A constraint may be added in water included in a cup, where the 'fluid' of water exists inside a boundary corresponding to the cup. If there is no constraint, the door falls downs, the clothes fall down, and the water is poured out. The foregoing content is summarized in Table 1.

TABLE 1

| Category | Section | Simulation scheme | Animation | State | Constraint |
|---|---|---|---|---|---|
| Solid | Rigid body | Rigid body dynamic | Dynamic animation | Dynamic or balanced | Possible application |
|  | Deformable body | Deformable body dynamics | Static animation | Static | No meaning |
| Fluid | Liquid | Fluid dynamics or particle system | Dynamic animation | Dynamic or balanced | Possible application |
|  | Gas |  | Dynamic animation | Dynamic or balanced | Possible application |

In accordance with an embodiment of the present invention, the content includes various data provided through Internet or a computer. In particular, the content of the present invention includes web content included in an HTML document, such as texts, images, icons, thumbnails, etc.

A procedure of applying a physical attribute to a specific part (character or image) in the web content is determined by a content provider and is reflected on the HTML document. If a network service application analyzes the HTML document to call a web API included in the web content while executing the web content, an animation engine generates a physical object for a corresponding part to generate an animation. Several examples of expressing a physical effect on the web content will be described herein.

For example, a rigid body attribute is applied to a specific part of the web content and accordingly a character or an image moves. A deformable body attribute is applied to a specific attribute of web content and accordingly the image rolls. If a fluid attribute is applied to a specific part of the web content and accordingly, when a part to which the fluid attribute is applied is touched, smoke occurs.

The content describe herein may be classified into a rigid body whose shape or size is not transformed, although an external force is applied thereto, a soft body having a shape or size that is transformed when an external force is applied, and a fluid that is expressed by a particle system composed of particles, e.g., a flame, smoke, snow, rain, etc.

When a rigid body collides with another object, the rigid body may be transformed into a fluid according to collision strength. For example, if a ball collides with a wall, the ball may be transformed into smoke.

Herein, animation refers to motion of content, particularly, web content, or a function of a mobile terminal of the motion. Particularly, animation includes an animation of the web content. Additionally, animation may be further classified into dynamic animation and static animation.

Herein, dynamic animation refers to animation in which a state of content is dynamically changed. For example, dynamic animation includes but is not limited to a bouncing ball, a waving flag, a flickering flame, etc. A displacement of content may be determined according to external input information (that is, an interaction event detected through a touch screen, a sensor, or a microphone). The displacement is a vector having the size and a direction. The size of the displacement includes at least one of a location, a moving distance, and speed of content.

Herein, dynamic animation may be further subdivided. Particularly, dynamic animation may be classified into a free motion animation and a limited motion animation according to whether a constraint is set. Limited motion animation refers to animation limiting a location or a direction of all or a part of content by a set constraint. For example, limited motion animation rotating content based on an externally optional axis, where the constraint is the axis. Free motion animation refers to animation that is freely changed without any constraints.

Herein, static animation refers to an animation in which a location and a direction of content having a rigid body attribute remain constant. For example, static animation includes, but is not limited to, a wall that is located in its place without motion and bounds an external object.

In the foregoing description, a physical attribute may be automatically set according to fundamental attribute information of corresponding content. For example, if the content includes an image indicating a camera, a physical attribute of the content may be determined as a rigid body. If the content includes an image indicating the flag, the physical attribute of the content may be determined as a deformable body. If the content includes an image indicating a flame, the physical attribute of the content may be determined as a fluid. The physical attribute may be optionally set by the user.

A dynamic presence may be automatically set according to fundamental attribute information of corresponding contents. For example, if the content includes a thumbnail indicating a weather widget, the content may be set as 'static'. If the content includes an image indicating a flag, the content may be set as 'dynamic'. The dynamic presence may be optionally set by the user.

The constraint may be automatically set according to fundamental attribute information of corresponding contents. For example, if the content includes an image indicating a pendulum, the content may be constrained to an optional axis. If the content includes a text, the constraint may be set to the content. Such a constraint may be optionally set by the user.

Although various embodiments of the present invention will be described below with reference to a mobile terminal including a touch screen as an input unit, the present invention is also applicable to a portable phone, a smart phone, a tablet Personal Computer (PC), a hand-held PC, a Portable Multimedia Player (PMP), a Personal Digital Assistant (PDA), etc.

In accordance with an embodiment of the present invention a method and apparatus are provided for playing an animation an object of an animation is determined in content and the animation is played according to attribute information of the determined object. Particularly, an animation of the determined object is played in response to an interaction event (e.g., touch gesture, intensity information of wind input from a microphone, and state information of a mobile terminal input from a sensor).

FIG. 1 is a block diagram illustrating a mobile terminal according to an embodiment of the present invention.

Referring to FIG. 1, the mobile terminal includes a touch screen 110, a key input unit 120, a display unit 130, a memory 140, a Radio Frequency (RF) communication unit 150, an audio processor 160, a speaker (SPK), a microphone (MIC), a near field communication unit 170, a sensor 180, and a controller 190. Herein, the term unit refers to a hardware device or combination of a hardware device and software.

The touch screen 110, e.g., a resistive type, a capacitive type, or a pressure type, is mounted at a front surface of the display unit 130 and receives and transfers a touch event to the controller 190 in response to a touch or a touch gesture of the user. The controller 190 detects a user gesture from a touch event and controls the mobile terminal according to the touch event.

For example, the touch includes an operation in which a user touches one point of a screen using a touch input unit (e.g., a finger or a stylus pen), and the touch gesture includes a tap, a double tap, a long tap, a drag, a drag & drop, a flick, etc. Here, the touch is an operation where a user pushes one point of a screen using a touch input unit (e.g., finger or stylus pen). The tap is an operation where the user touches-off the touch input unit in a corresponding point without a motion of the touch input unit after touching one point. The double tap is an operation where a user continuously one twice. The long tap is an operation where a finger is released from a corresponding point without a motion of the touch input unit after touching one point longer than the tap. The drag is an operation that moves a finger in a predetermined direction in a state that one point is touched. The drag & drop is an operation that escapes a touch input unit after drag. The flick is an operation that escapes a touch input unit after moving it by bouncing at high speed like flipping. The touch means a state contacted on the touch screen, and the touch gesture means a motion from touch-on of the touch on the touch screen to touch-off of the touch. Further, a resistive type, a capacitive type, and a pressure type are applicable to the touch panel 111.

The key input unit 120 includes a plurality of input keys and function keys for receiving numeric or character information and setting various functions. The function keys may include arrow keys, side keys, and hot keys set such that a specific function is performed. The key input unit 120 generates and transfers a key signal associated with user setting and function control of the mobile terminal 100 to the controller 190. The key signal may be classified into an on/off signal, a volume control signal, and a screen on/off signal. The controller 190 controls the foregoing constituent elements in response to the key signal. The key input unit 120 may include a QWERTY keypad, a 3*4 keypad, and a 4*3 keypad having a plurality of keys. When the touch screen 110 of the mobile terminal 100 is supported in the form of a full touch screen, the key input unit 120 may include only at least one side key for screen on/off and portable terminal on/off, which is provided in a side of a case of the mobile terminal 100.

The display unit 130 converts image data inputted from the controller 190 into an analog signal, and displays the analog signal under the control of the controller 190. That is, the display unit 130 may provide various screens according to use of the portable terminal, for example, a lock screen, a home screen, an application (hereinafter referred to as 'App') execution screen, a menu screen, a keypad screen, a message creation screen, and an Internet screen. A lock screen may be defined as an image displayed when a screen of the display unit 130 becomes large. When a specific touch event for releasing the locking occurs, the controller 190 may convert a displayed image from a lock screen into a home screen or an App execution screen. The home screen may be defined as an image including a plurality of App icons corresponding to a plurality of Apps, respectively. When one is selected from a plurality of App icons by a user, the controller 190 may execute a corresponding App, for example, electronic book App and convert a displayed image into an execution screen.

Particularly, the display unit 130 displays an animation under the control of the controller 190. Herein, the display unit 130 displays at least one of a free motion animation, a limited motion animation, and a static animation.

For example, the display unit 130 may display a free motion animation such as a bouncing ball or a plurality of objects that freely fall in a set gravity direction. The display unit 130 may also display a limited motion animation such as a revolving door, a chain, or a ball moving along a preset track. Additionally, the display unit 130 may display a static animation such as a wall that does not move. Further, the display unit 130 may any combination of a free motion animation, a limited motion animation, and a static animation.

The display unit 130 may be configured as a flat panel display such as a Liquid Crystal Display (LCD), an Organic Light Emitted Diode (OLED), or an Active Matrix Organic Light Emitted Diode (AMOLED).

The memory 140 stores an Operating System (OS) of the mobile terminal, and applications and various data for playing an animation in accordance with an embodiment of the present invention. Basically, the memory 140 includes a data region and a program area.

The data area of the memory 140 stores data for use in operation the mobile terminal and generated through use of the mobile terminal. For example, the data area may an HTML document including web content received through the RF communication unit 150 or the near field communication unit 170. Further, the data area may store screens that are displayed on the display unit 130. The menu screen may include a screen switch key (e.g., a return key for returning to a previous screen) for switching the screen and a control key for controlling a currently executed App. The data area may store data which the user copies from messages, photographs, web pages, or documents for copy & paste. The data area may store various preset values (e.g., screen brightness, presence of vibration during generation of touch, presence of automatic rotation of the screen) for operating the mobile terminal.

The program area of the memory 140 stores the OS and various applications for operating the mobile terminal. The program area may store a web browser for accessing an Internet, an MP3 player for playing a sound source, and a camera App. The web application is software that a user uses via a web browser through the Internet. For example, the web application includes web mail, an Internet board, a blog, on-line electronic commerce, a web game, etc. The web application is different from an existing static web page. For example, the web application allows a user to interactively exchange information. The web browser is an infrastructure layer for executing the web application.

In accordance with an embodiment of the present invention, the program area stores an animation engine that determines an object for animation from content, particularly, web content, and generates an animation of the determined object. Further, the program area stores a rendering engine for rendering the generated animation of the web content from the animation engine.

The rendering engine includes at least one of a webkit, a Web-based Graphics Library (WebGL), and a Cascading Style Sheets (CSS), which are generally known in the art, and thus, a detailed description thereof is omitted herein.

Additionally, the rendering engine may be a partial constituent element of the web browser.

The animation engine performs physically-based simulation. The physically-based simulation expresses motion of all objects by a motion equation. Specifically, the physically-based simulation refers to a procedure of solving the motion equation based on an initial state and an interaction event to calculate a current state (location, direction, shape).

The animation engine may perform various physically-based simulations according to a type of object, e.g., a rigid body whose shape is not changed, a soft body whose shape may be changed in a motion procedure, and a fluid like smoke whose shape is not fixed from the beginning The animation engine also calculates collisions between objects and generates an animation associated with the collision.

The RF communication unit 150 performs RF communication with other devices in order to perform a voice call, an image call, data communication, etc., under the control of the controller 190. To do this, the RF communication unit 150 may include an RF transmitter for up-converting a frequency of a transmitted signal and amplifying the converted signal, and an RF receiver for low-noise-amplifying a frequency of a received signal and down-converting the amplified signal. The RF communication unit 150 may include a mobile communication module (e.g., 3-generation mobile communication module, 3.5-generation mobile communication module, or 4-generation mobile communication module, etc.), and a digital broadcasting module (e.g., DMB module). Particularly, the RF communication unit 150 may connect with Internet and receive and transfer an HTML document to the controller 190.

The audio processor 160 transmits an audio signal received from the controller 190 to the speaker (SPK), and transfers an audio signal such as a voice received from the (MIC) to the controller 190. In accordance with an embodiment of the present invention, the audio processor 160 outputs an animation effect sound to the speaker (SPK) under the control of the controller 190. The effect sound may be changed according to a location, speed, and attribute information of movable content. For example, the animation effect sound includes, but is not limited to, a flapping sound of a flag, a flickering sound of flame, a burning sound of a burning object, a rolling sound of an object, a crashing sounds where an object falls and collides, a crashing sound between colliding objects, etc. Various animation effect sounds may be downloaded from a network and stored in the memory 140.

Additionally, the audio processor 160 receives input information associated with the animation from the MIC and transfers the received input information to the controller 190. For example, the information input from the MIC includes intensity information and continuous time information of wind.

The near field communication unit 170 connects the mobile terminal to an external device in a wired or wireless near filed communication scheme. For example, the near distance communication unit 170 may include a Zigbee module, a Wi-Fi module, or a Bluetooth module.

In accordance with an embodiment of the present invention, the near field communication unit 170 connects with the mobile terminal to the Internet in order to receive an HTML document and transfers the received HTML document to the controller 190.

The sensor 180 detects information associated with physical movements of the mobile terminal such as a location, speed, acceleration, and a gradient of the mobile terminal, and a direction of gravity applied to the mobile terminal, and transfers the detected information to the controller 190.

The controller 190 performs a function of controlling an overall operation of the portable terminal 100 and signal flow between internal constituent elements of the portable terminal 100, and processing data. The controller 190 controls power supply from a battery to internal constituent elements. The controller 190 may execute various applications stored in a program area. In particular, the controller 190 according to the present invention may include modules shown in FIG. 2 for playing the animation.

Figure 2:
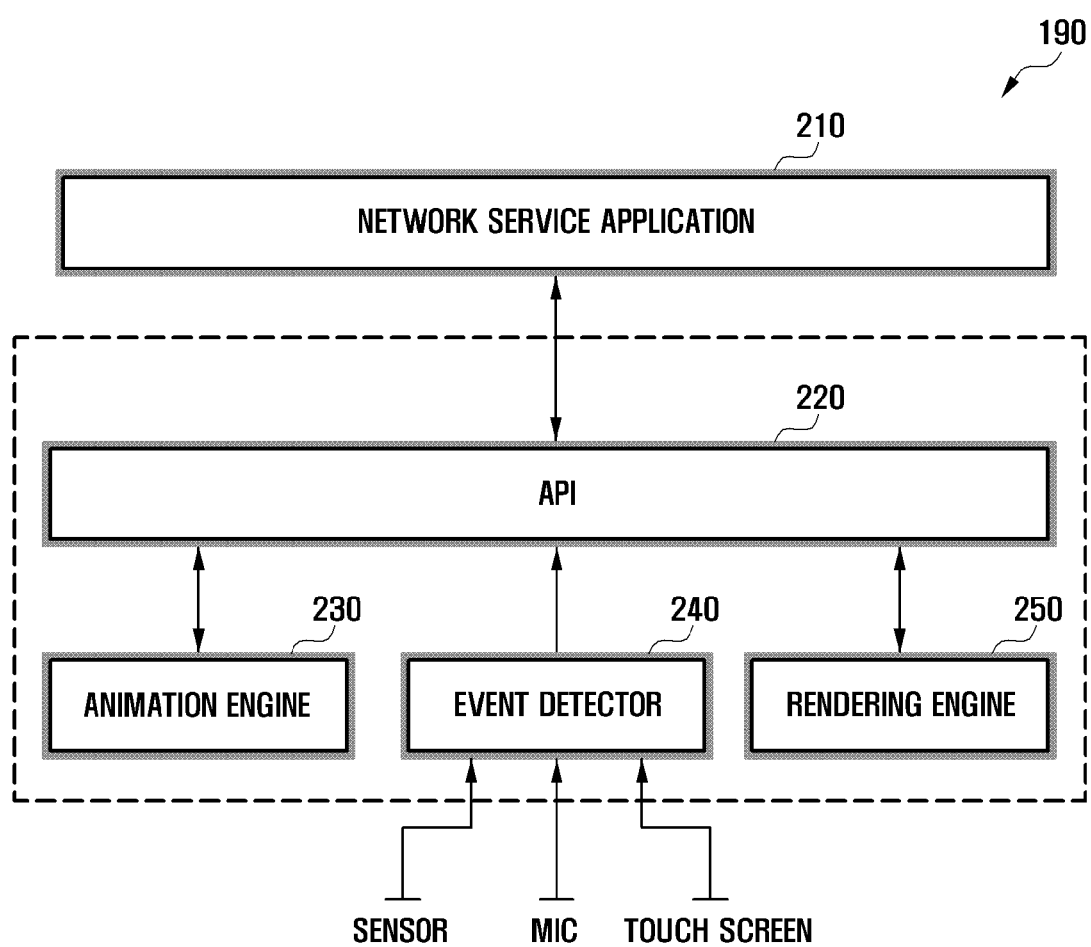
FIG. 2 is a diagram illustrating a controller according to an embodiment of the present invention.

FIG. 2 illustrates a controller according to an embodiment of the present invention.

Referring to FIG. 2, the controller 190 includes a network service application 210, an Application Programming Interface (API) 220, an animation engine 230, an event detector 240, and a rendering engine 250.

The network service application 210 implements a network service that enables the mobile terminal to exchange various content through a network. The network service application 210 includes a web application based on a web browser, a Social Network Service (SNS) service application, an e-mail service application, an Instant Messenger, a message service application, a widget service application, etc. Herein, it is assumed that the network service application 210 is a web application that connects to the Internet through the RF communication unit 150 or the near field communication unit 170 to receive an HTML document.

The network service application 210 calls the animation engine 230 and the rendering engine 250 through the API 220, and receives an interaction event from the event detector 240 through the API 220. Specifically, the network service application 210 transfers the HTML document to the animation engine 230 through the API 220 to request generation of the animation. The network service application 210 may transfer the interaction event to the animation engine 230 to request the interaction event to be reflected onto the generation of the animation.

The network service application 210 determines attributes (e.g., a physical attribute, a collision attribute, a constraint, an interaction event, a playback time, a dynamic presence, etc.) with respect to respective content included in the HTML document. The network service application 210 may determine attributes of web contents based on additional information of the web contents (e.g., information indicating a type of web contents, information indication a scale of the web contents, information indicating a shape of the web contents, etc.) received together with reception of the HTML document. Additionally, the network service application 210 may determine the attribute of the web contents based on attribute information stored in the memory 140.

The network service application 210 may receive the HTML document including the attribute information of the web content over the Internet through the RF communication unit 150 or the near field communication unit 170.

The network service application 210 receives an animation generated by the animation engine 230 through the API 220. The network service application 210 transfers the HTML document to the rendering engine 250 through the API 220 to request the rendering engine 250 to render the HTML document, and transfers the animation to the rendering engine 250 through the API 220 to request the rendering engine 250 to render the animation. The network service application 210 may control the display unit 130 to display the rendered HTML document and animation.

The API 220 provides a language or message format used when the network service application 210 communicates with the animation engine 230, the event detector 240, and the rendering engine 250.

The network service application 210 determines an object of the animation from the web content. For example, the network service application 210 may determine a thumbnail, an image, or a text as an object of the animation in web content. The network service application 210 may determine web content whose attribute is a rigid body as the object of the animation. The object of the animation may be optionally set by the user.

The animation engine 230 generates a limited motion animation, a free motion animation, or a static animation with respect to the determined object, e.g., in response to the interaction event. Specifically, the animation engine 230 generates an animation of web content based on an initial state (e.g., location) and attribute information of web content determined as an animation object and the interaction event. When there is a plurality of web content, the animation engine 230 calculates a collision between the web content and generates the animation associated with the collision between the web content. The animation engine 230 transfers the generated animation to the network service application 210.

The event detector 240 detects the interaction event, and transfers the detected input information to the network service application 210 through the API 220. Specifically, the event sensor 240 is connected to the touch screen 110, detects a touch gesture of the user with respect to the touch screen 110, and transfers information associated with the detected touch gesture to the network service application 210 through the API 220. For example, the transferred information includes a touched point, and a moving direction and moving speed of the touch.

The event detector 240 is connected to the MIC through the audio processor 160, detects input of information (e.g., intensity information and continuous time of wind), and transfers the detected input information to the network service application 210 through the API 220. The event detector 240 is also connected to the sensor 180, detects input of information from the sensor 180, and transfers the input information to the network service application 210 through the API 220. For example, the information input from the sensor 180 may be a gravity direction and shaking presence.

The rendering engine 250 receives the HTML document from the network service application 210 through the API 220, and renders the received HTML document. The rendering engine 250 transfers the rendered HTML document to the network service application 210 through the API 220. The rendering engine 250 receives an animation from the network service application 210 through the API 220, and renders the received animation. The rendering engine 250 transfers the rendered animation to the network service application 210 through the API 220.

The API 220, the animation engine 230, an event detector 240, and the rendering engine 250 may be included in a platform.

Alternatively, the mobile terminal may include a Graphics Processing Unit (GPU) or an Application Processor (AP), which may include the animation engine 230 and the rendering engine 250. Additionally, the event detector 240 may be configured separately from the controller 190, i.e., outside the controller 190.

Although the mobile terminal in FIG. 1 is illustrated and described with the touch screen 110 and the key input unit 120, the mobile terminal may also or alternatively include a touch pad, a track ball, and a key board.

Figure 3:
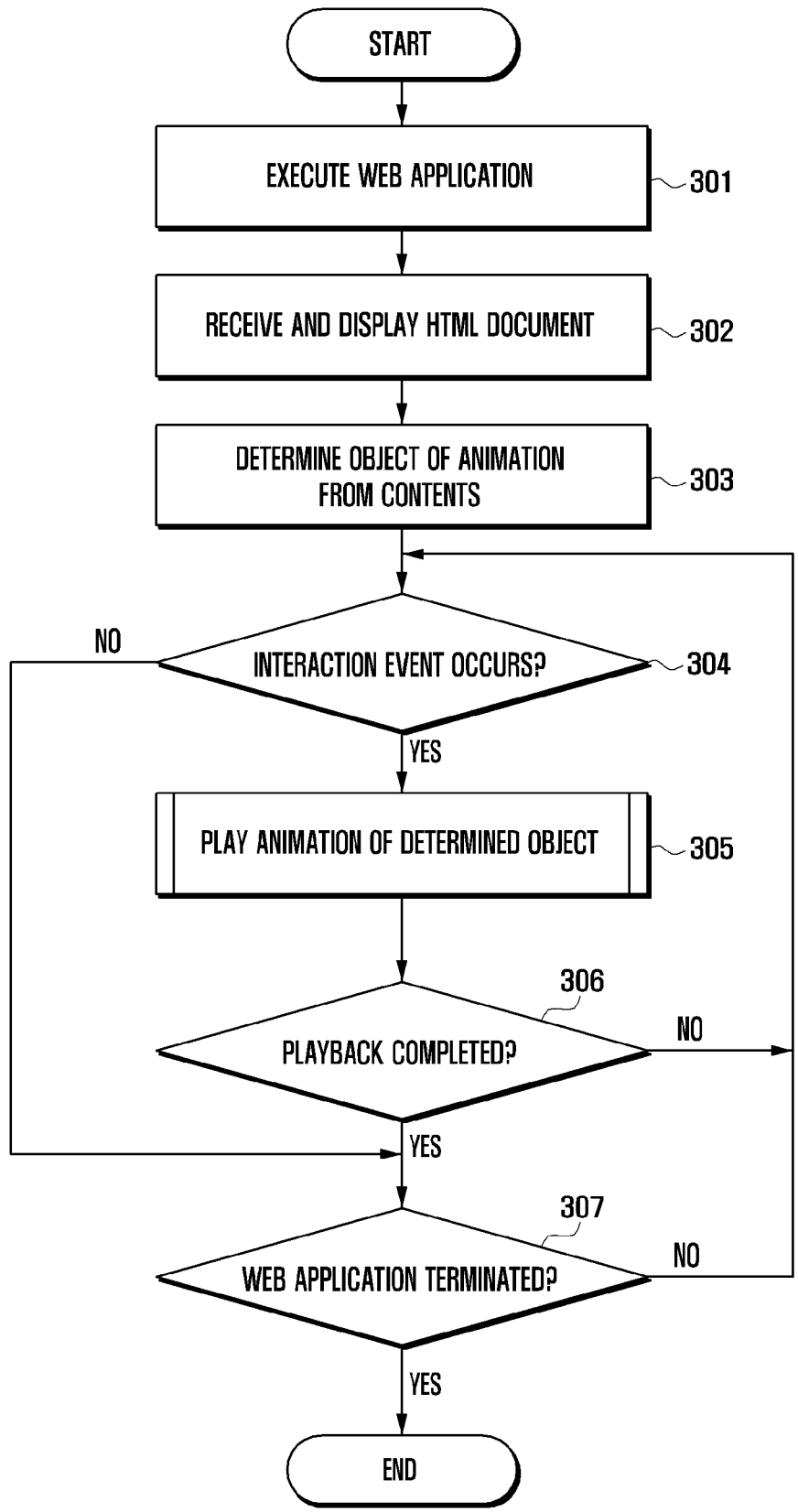
FIG. 3 is a flowchart illustrating a method of playing an animation according to an embodiment of the present invention.

FIG. 3 is a flowchart illustrating a method of playing an animation according to an embodiment of the present invention.

Referring to FIG. 3, in step 301, a touch gesture associated with an execution request of a web application is detected in the idle state, and the controller 190 executes the web application. For example a home screen is displayed on the mobile terminal including an icon that is selected by a user for executing a web application.

In step 302, the controller 190 receives an HTML document from the Internet, e.g., through the RF communication unit 150 or the near field communication unit 170, and controls the display unit 130 to display the received HTML document.

In step 303, the controller 190 determines an object of an animation from content of the HTML document. For example, the controller 190 may determine a thumbnail, an image, or a text from the web content as an object of the animation or may determines web content being a rigid body, a deformable body, and/or a fluid as an object of the animation. Additionally, the controller 190 may determine the object of the animation from the web content based on animation object information stored in the memory 140. Additionally, the animation object information may be changed by the user.

In step 304, the controller 190 determines whether an interaction event occurs.

When the interaction event occurs, the controller 190 plays an animation of the determined object in step 305, determines if the playback of the animation is completed in 306, and the controller 190 determines whether a web application is terminated 307, if the playback of the animation is completed in 306. If the web application is not terminated, the process returns to step 304 to determine if another interaction event is received.

When no interaction event occurs in step 304, the controller determines whether a web application is terminated 307.

When the web application is terminated 307, the procedure is ended.

Figure 4:
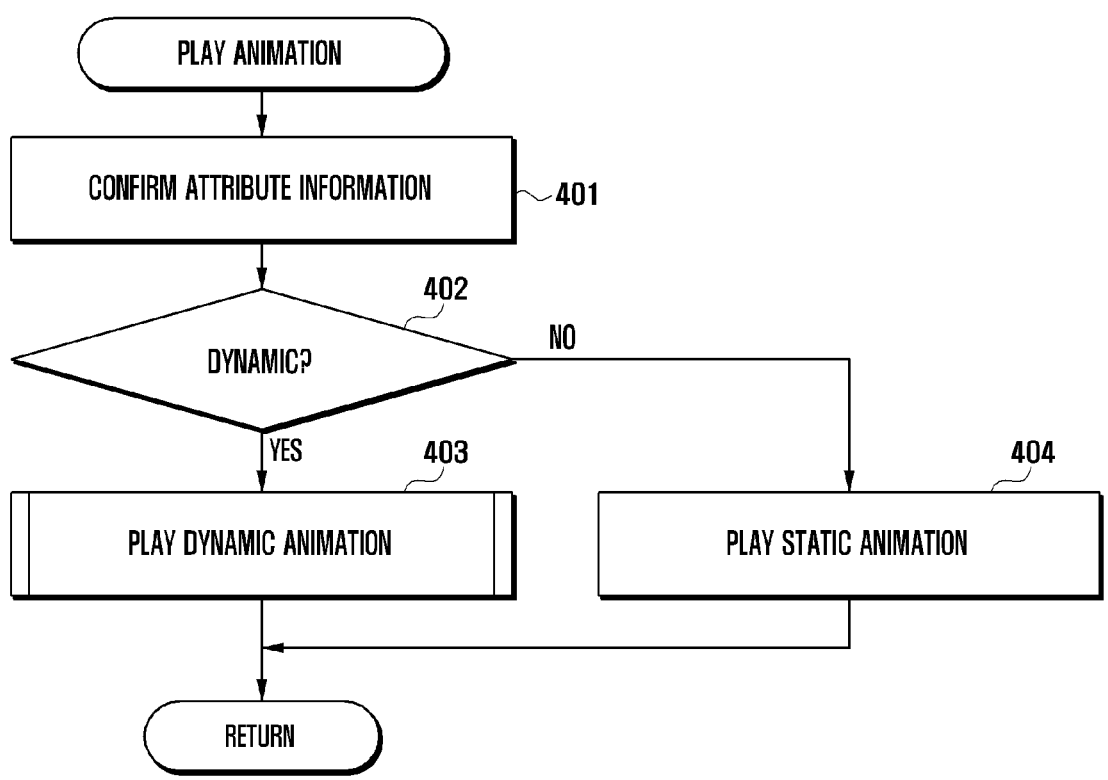
FIG. 4 is a flowchart illustrating a procedure of playing an animation according to an embodiment of the present invention.

FIG. 4 is a flowchart illustrating a procedure of playing an animation according to an embodiment of the present invention.

Referring to FIG. 4, the controller 190 confirms attribute information of the determined object in step 401, and determines whether an attribute of the determined target is set as 'dynamic' in step 402.

When the attribute of the determined target is set as 'dynamic', the controller 190 plays a dynamic animation in step 403. For example, the controller 190 may play a burning animation of a touched icon, or may play an animation in which a touched thumbnail waves like a flag flying in the wind. If an icon indicating a hyper link is double tapped, the controller 190 may play an animation in which a corresponding icon is transformed to a fluid (e.g., smoke), and the smoke disappears after a preset time (e.g., one second). When the smoke disappears, the controller 190 may control such that a web page of a corresponding hyper link is displayed. The dynamic animation may continue until the web application is terminated or may continue for a preset time (e.g., five second). Additionally, if the user touches the corresponding content again, the dynamic animation may be stopped, restoring the content to an original state.

When the attribute of the determined target is not set as 'dynamic', the controller 190 determines the attribute of the determined object to be set as 'static', and plays a static animation in step 404. For example, the controller 190 may play an animation that locates a touched icon in its place and bounds another icon. The static animation may continue until the web application is terminated or may continue for a preset time (e.g., five seconds). Additionally, if the user touches the corresponding content again, the static animation may be stopped, restoring the content to an original state.

Figure 5:
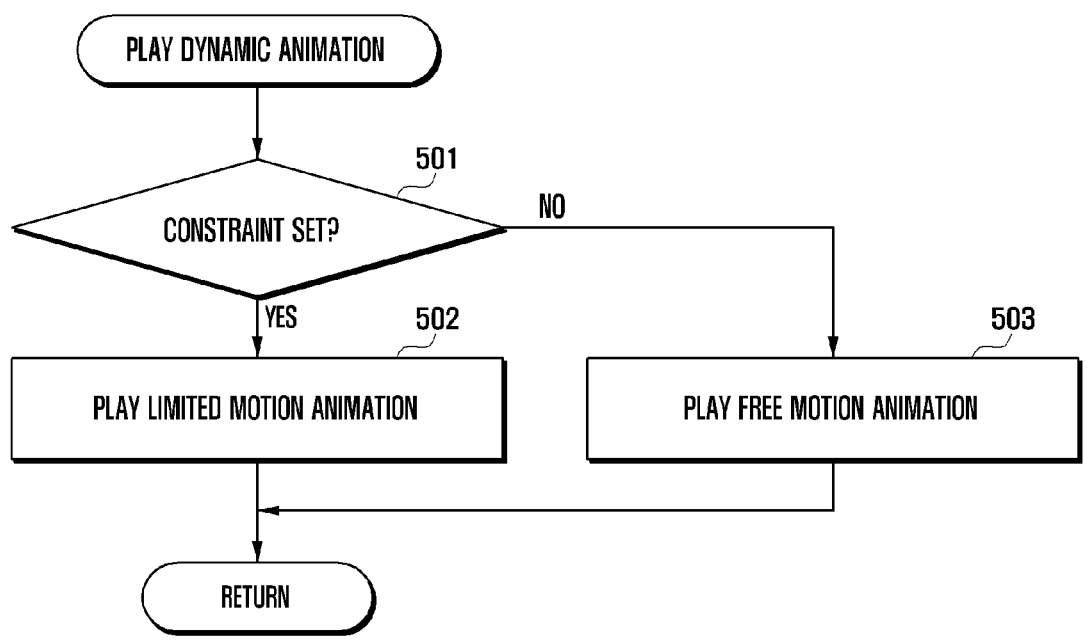
FIG. 5 is a flowchart illustrating a procedure of playing a dynamic animation according to an embodiment of the present invention.

FIG. 5 is a flowchart illustrating a procedure of playing a dynamic animation according to an embodiment of the present invention.

Referring to FIG. 5, a controller 190 determines whether a constraint with respect to the determined object is set in step 501.

When the constraint with respect to the determined object is set, the controller 190 plays a limited motion animation based on the detected interaction event in step 502. For example, when the interaction event is detected, the controller 190 sets an optional point outside the web content being a motion object as an axis and then rotates the web content based on the set axis based on an interaction event. If the user shakes the mobile terminal 100, the sensor 180 detects associated information and transfers the detection result to the controller 190. The controller 190 may calculate an acceleration of the mobile terminal 100 based on the received information. The controller 190 determines rotating speed of the web contents based on the calculated acceleration. The controller 190 generates and plays an animation performing deceleration motion based on the determined rotating speed.

Although the constraint described in step 502 is an axis, the present invention is not limited thereto, and the limitation of the motion may be set to various constraints.

Additionally, although the interaction event is input from the sensor 180 in the example above, the interaction event may be input from the MIC or the touch screen 110.

When the constraint with respect to the determined object is not set in step 501, the controller 190 plays a free motion animation based on the detected interaction event in step 503. For example, when the user lifts the mobile terminal off of flat surface, the controller 119 detects change of the gravity direction and may generate and play an animation that moves web content whose attribute is dynamically set in a changed gravity direction. If the user operates the touch screen 110 to flick one object from the displayed web content, the controller 190 detects a direction of the flick and may generate and play an animation moving the object of the web content in the detected direction of the flick. If the user blows into the MIC, the controller 190 may detect the direction of the wind and generate and play an animation moving web content whose attribute is dynamically set in the direction of wind.

Figure 6:
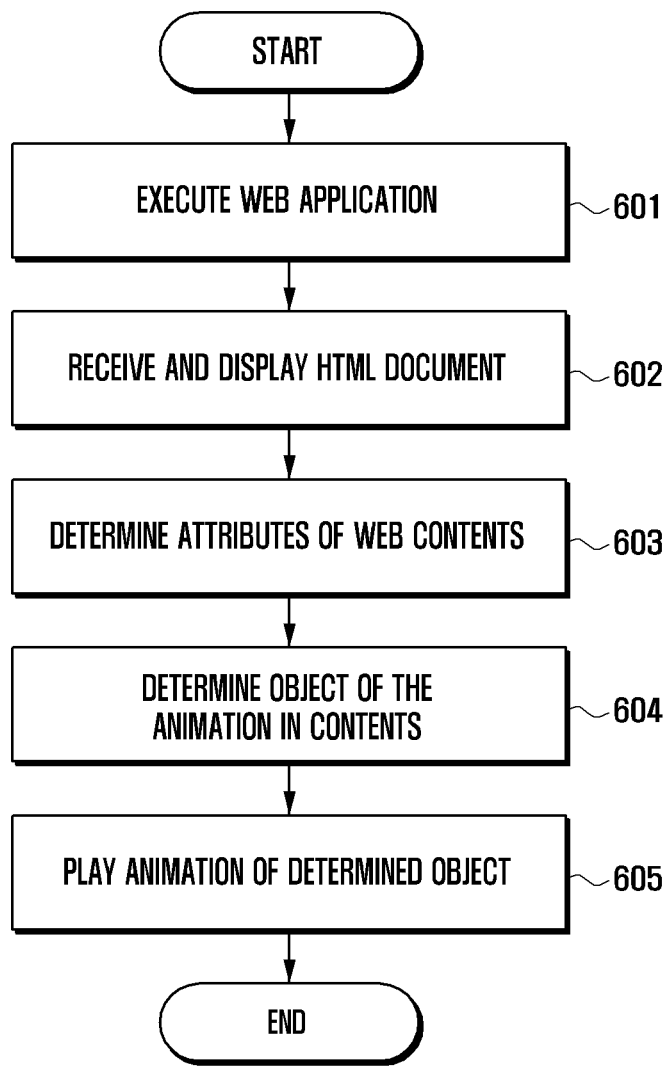
FIG. 6 is a flowchart illustrating a method of playing an animation according to an embodiment of the present invention.

FIG. 6 is a flowchart illustrating a method of playing an animation according to an embodiment of the present invention. Specifically, the method illustrated in FIG. 6 is directed to playback of an animation being performed regardless of whether the interaction event occurs. That is, the animation of the web content whose physical attribute is determined as a deformable body or a fluid may be played regardless of whether the interaction event occurs.

Referring to FIG. 6, the controller 190 receives an input, e.g., a touch gesture, associated with an execution request of the web application and executes the web application in step 601. In step 602, the controller 190 receives an HTML document from the Internet through the RF communication unit 150 or the near field communication unit 170 and controls the display unit 130 to display the received HTML document.

In step 603, the controller 190 determines attributes of respective web content included in the HTML document. For example, the attribute may include a physical attribute, a collision attribute, a constraint, an interaction event, a playback time, a dynamic presence, etc.

Additionally, the controller 190 may determine an attribute of web content based on additional information of the received web content. For example, when the web content is an icon indicating a hyper link, the controller 190 may determine a physical attribute of corresponding web content as a rigid body. The controller 190 may receive the HTML document including attribute information of the web content from the Internet through the RF communication 150 or the near field communication unit 170, and determine an attribute of the web content based on the received attribute information. The controller 190 may store the received attribute information in the memory 140 and may determine an attribute of the web contents based on the stored attribute information. Additionally, the stored attribute information may be optionally changed by the user.

In step 604, the controller 190 determines an object of the animation in the web content. Step 604 is the same as step 303, which is described above in connection with FIG. 3, and therefore, repetitive description thereof is omitted here.

In step 605, the controller 190 statically or dynamically plays an animation of the determined object.

When the controller 190 plays a dynamic animation, e.g., when the determined object of the animation is a rigid body, the controller 190 may play an animation in which corresponding web content rotate based on an internal center axis. When the determined object of the animation is the deformable body, the controller 190 may play an animation whose shape of corresponding web content is changed (e.g., a waving flag). When the determined object of the animation is a fluid, the controller 190 may play the animation in which corresponding web content are transformed (e.g., an object being burned into ashes).

Figure 7:
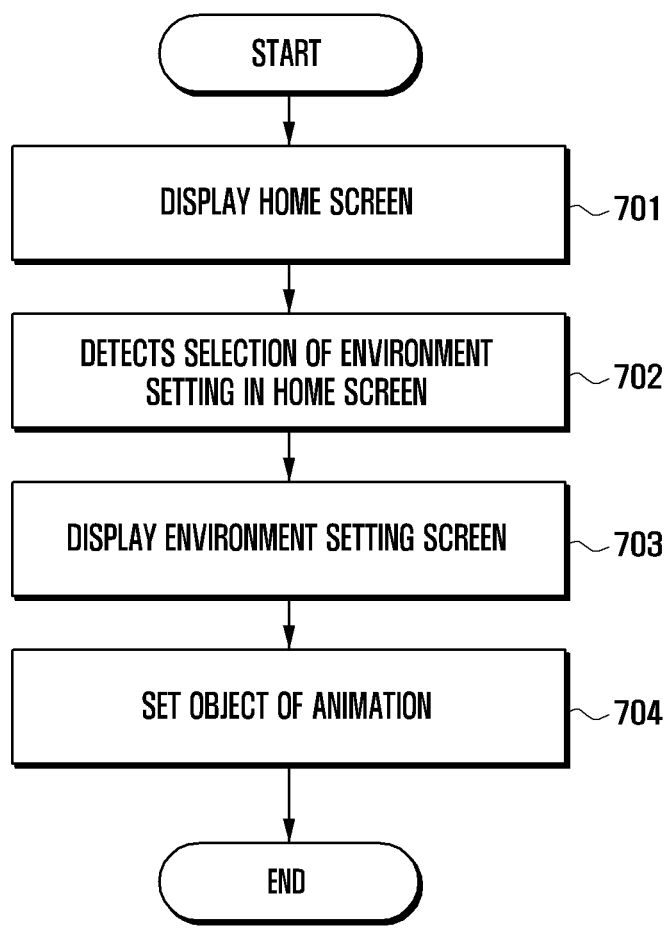
FIG. 7 is a flowchart illustrating a method for setting animation according to an embodiment of the present invention.

FIG. 7 is a flowchart illustrating animation setting according to an embodiment of the present invention.

Referring to FIG. 7, the controller 190 control the display unit 130 to display a home screen ion step 701. The home screen includes an icon corresponding to environment setting. In step 702, the user touches the icon and the controller 190 detects the selection of the icon. In step 703, the controller 190 controls the display unit 130 to display an environment setting screen for setting an environment of the mobile terminal 100. In step 704, the controller 190 sets an environment of the mobile terminal, i.e., an attribute of web content to set an object of the animation. The animation setting information is stored in the memory 140 of the mobile terminal and may be used when a web application is executed.

FIG. 8 illustrates examples of screens for setting different functions of a mobile terminal according to an embodiment of the present invention. Specifically, screen (a) in FIG. 8 is a screen for setting an environment of the mobile terminal.

Referring to screen (a) in FIG. 8, the display unit 130 displays an environment setting screen 800 under control of the controller 190. In the example of screen (a), the environment setting screen 800 includes a wireless network 810, a location service 820, a sound 830, a display 840, a security 850, and an animation 860. For example, when the user touches the animation 860 item, the controller 190 controls the display unit 130 to display the animation setting screen.

Screens (b) and (c) of FIG. 8 are examples of screens for setting an animation.

Referring to screen (b) of FIG. 8, the display unit 130 displays the animation setting screen 860 under control of the controller 190. In the example of screen (b), the animation setting screen 860 includes a physical attribute 861, a collision attribute 862, a constraint 863, an interaction event 864, a playback time 865, and static/dynamic 866. The physical attribute 861 is an item that sets the physical attribute of web content as a rigid body, a deformable body, or a fluid.

In the example of screen (c), the physical attribute is set as the rigid body, and a weight 8611, a damping coefficient 8611, a friction coefficient 8613, strength 8614, a force applied to the rigid body 8615, a torque and an elastic force 8616 may be set.

Referring again to the example of screen (b), the collision attribute 862 is an item for simplifying a shape of the web contents. For example, the shape of the web content may be simplified to a box, a sphere, a triangle mesh, or a compound shape being a combination thereof. In general, the web content may have the compound shape, and a collision simulation between the compound shapes requires a large calculation amount. To simplify collision calculation, the controller 190 simplifies the shape of the web content to a preset shape.

The constraint 863 is an item for a limited motion animation. For example, the constraints may include a hinge, a slider, and point to point (P2P). For the hinge, an animation whose web content is constrained to the hinge and rotates is possible. For the slider, an animation in which a length of an antenna or a microscope is adjusted is possible. For a P2P constraint, an animation in which at least two content like a train are connected and move is possible.

The interaction event 864 is an item that sets whether the interaction event is allowed. The controller 190 plays an animation in response to the detected interaction event. Any one or combination of a touch gesture, an input signal of the sensor 180, and an input signal of the microphone MIC may be allowed as an interaction event to which the controller 190 responds.

The playback time 865 is an item that sets a playback time of the animation and the dynamic/static 866 are items for setting the animation as dynamic or static.

FIG. 9 illustrates an example of a web API according to an embodiment of the present invention.

Referring to FIG. 9, SLPdeviceapis.Physics.World 910 is a web API for managing a physical simulation. SLPdeviceapis.Physics.World 910 may manage all animation objects through a rigid body, a deformable body, or a fluid, set a common attribute like gravity to the animation objects, and updates the animation.

SLPdeviceapis.Physics.PhysicsObjects.RigidBody 920 is a web API for setting various attributes of the rigid body, for example, a weight, a damping coefficient, a friction coefficient, strength, a force applied to the rigid body, and a rotating force applied to the rigid body. SLPdeviceapis.Physics.CollisionShapes.Sphereshape 930 is a web API for simplifying a shape of web contents to a sphere. Although not illustrated in FIG. 9, SLPdeviceapis.Physics.CollisionShapes.Boxshape is a web API for simplifying a shape of web content to a box, SLPdeviceapis.Physics.CollisionShapes.Trianglemeshshape is a web API for simplifying a shape of the web content to a triangle mesh, and SLPdeviceapis.Physics.Constraints is a web API for setting the constraint. The constraint may include a hinge, a slider, and P2P, as described above.

FIG. 10 illustrates an example of an HTML document according to an embodiment of the present invention.

Referring to FIG. 10, web content in which a class is set as dynamic 1010 in the HTML document is determined as an object of the dynamic animation. Web content in which a class is set as static 1020 in the HTML document is determined as an object to the static animation, i.e., web content that is not moved at all. That is, if the class of the web content is set as 'static', corresponding web content is fixed in place and collide with another web content to be bounded.

FIGS. 11 to 14 illustrate animation playing screens according to embodiments of the present invention.

Figure 11:
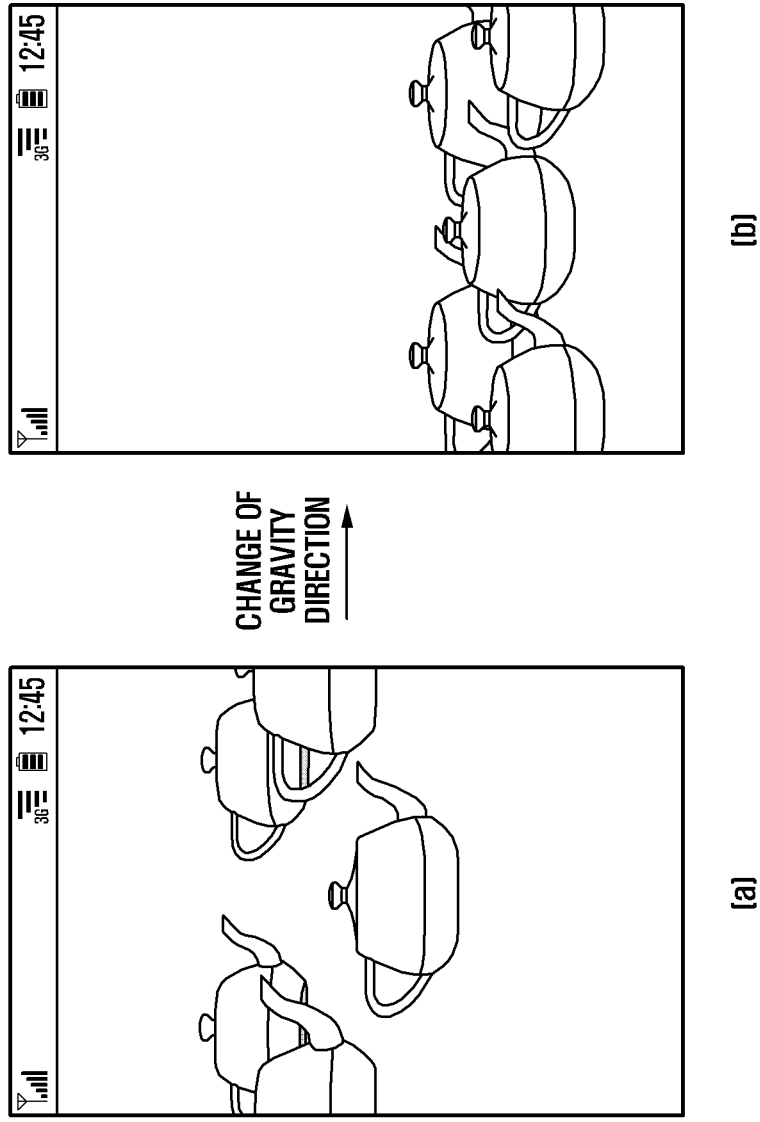
FIGS. 11 to 14 illustrate animation playing screens according to an embodiment of the present invention.

Referring to FIG. 11, in screen (a) the display unit 130 displays a plurality of kettles under control of the controller 190. When the user lifts the mobile terminal, the kettles move to a changed gravity direction (e.g., downward), as illustrated in screen (b).

Figure 12:
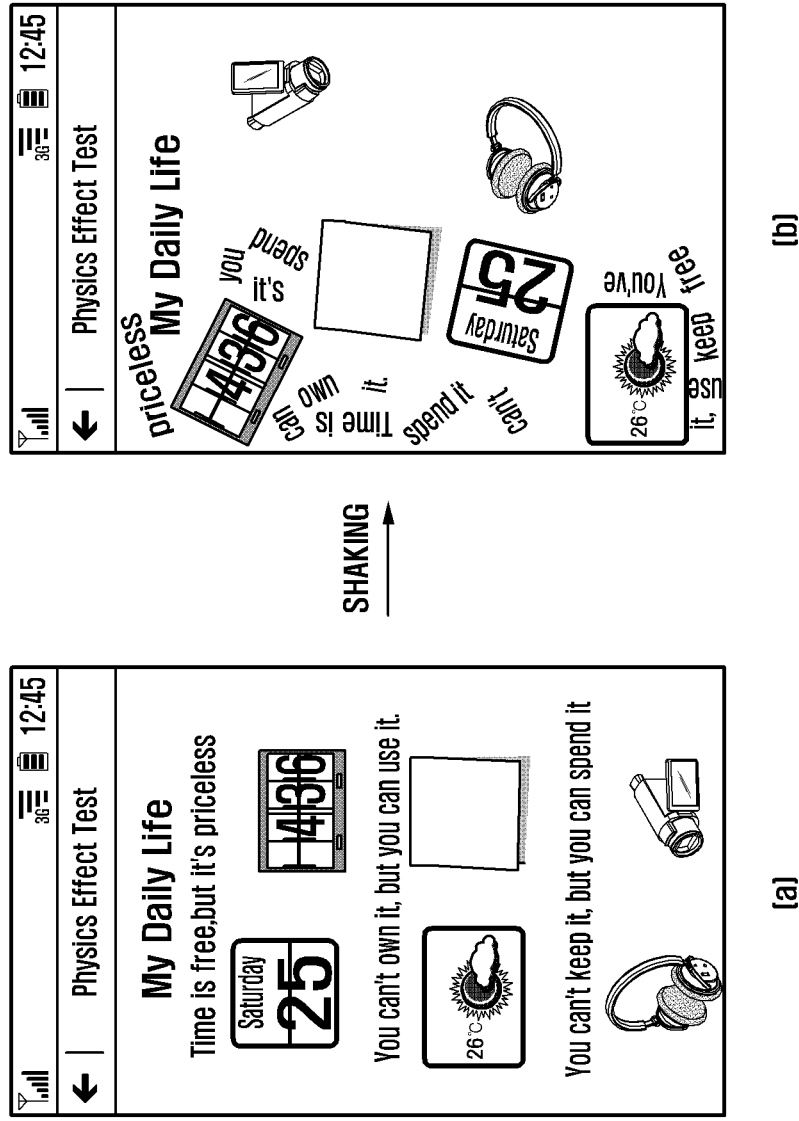

Referring to FIG. 12, in screen (a) the display unit 130 displays text and images. When the user shakes the mobile terminal, the controller 190 detects the shaking, and calculates an acceleration of the mobile terminal. When the calculated acceleration is equal to or greater than a preset threshold, for example, a gravity acceleration (9.8 m/s2), the controller 190 plays an animation wherein the text and images are moved around in a direction of the calculated acceleration.

Figure 13:
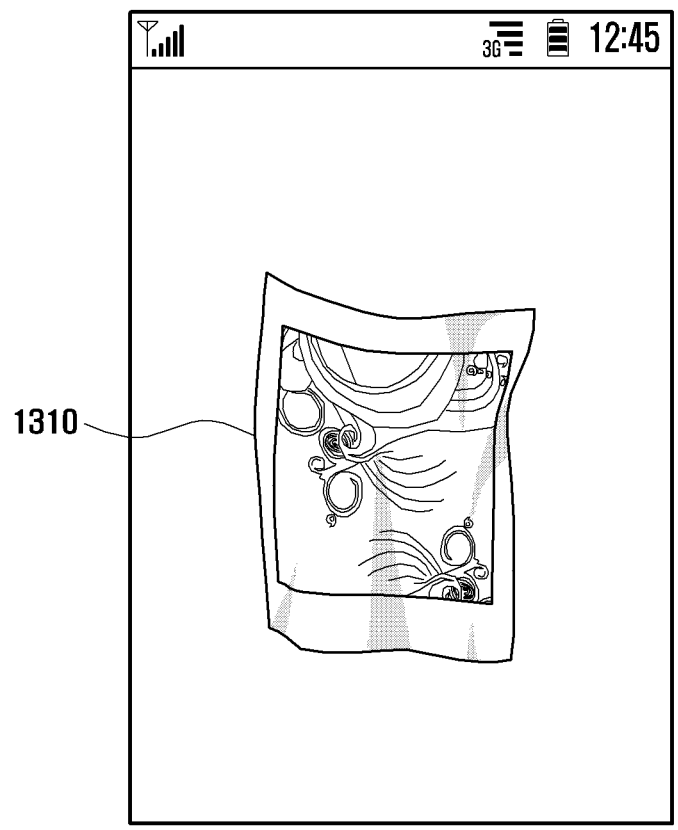

Referring to FIG. 13, the controller 190 receives an image from the Internet through the RF communication unit 150 or the near field communication unit 170 and determines an attribute of the received image as a deformable body. The controller 190 plays an animation 1310 having received image of flag waving in the wind.

Figure 14:
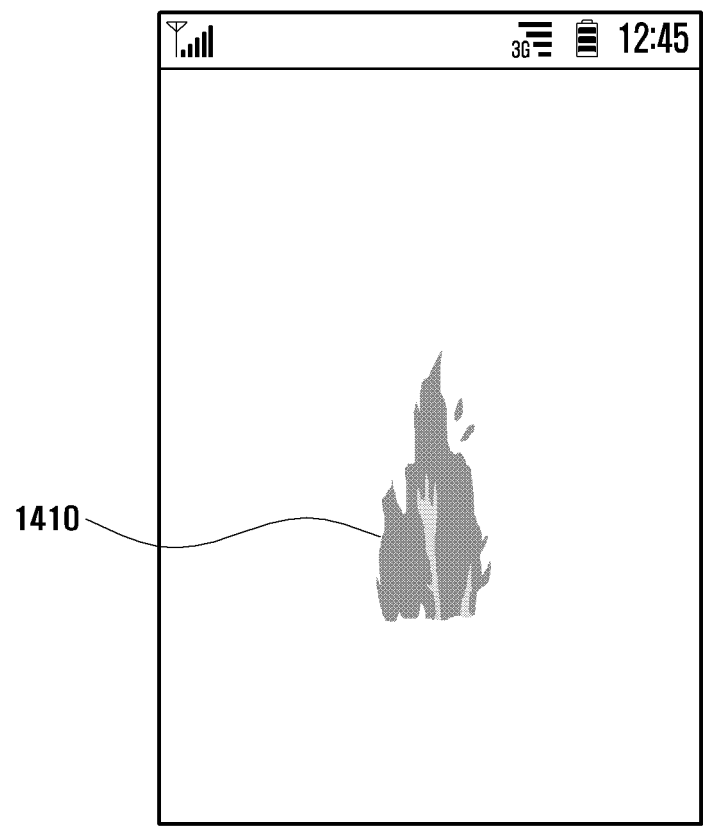

Referring to FIG. 14, the controller 190 receives an image of a flame from the Internet through the RF communication unit 150 or the near field communication unit 170 and determines the attribute of the received image as fluid. As illustrated in FIG. 14, the controller 190 plays an animation of the burning flame.

Additionally, the above-described methods and apparatuses for playing an animation may be implemented in an executable program command form by various computers and may be recorded in a computer readable recording medium. In this case, the computer readable recording medium may include a program command, a data file, and a data structure individually or a combination thereof. The program command recorded in a recording medium may be specially designed or configured for the present invention or be known to a person having ordinary skill in a computer software field to be used. The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as a floptical disk, and a hardware device such as a ROM, a Random Access Memory (RAM), and a flash memory storing and executing program commands. Further, the program command includes a machine language code created by a compiler and a high-level language code executable by a computer using an interpreter.

According to the above-described methods and the apparatuses for playing an animation in a mobile terminal, the mobile terminal can provide an animation of actual web content. Further, the various embodiments of the present invention provide an animation of actual web content in response to external input information.

Although certain embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims and their equivalents.

What is claimed is:

1. A method of playing an animation in a mobile terminal, the method comprising:
   receiving a document from a network;
   in response to receiving the document, displaying at least a portion of the document on a screen and determining at least one of a plurality of contents included in the displayed at least the portion of the document as an object of an animation; and
   when an interaction event occurs while displaying the at least the portion of the document, playing an animation of the determined object without animating at least one content which is not determined as an object of the animation,
   wherein playing the animation of the determined object comprises:
      confirming attribute information of the determined object;
      playing a dynamic animation in which at least one of a location and a direction of the determined object is changed, when the attribute information indicates that the determined object is dynamically set; and
      playing a static animation in which the location and the direction of the determined object remain constant, when the attribute information indicates that the determined object is statically set.

2. The method of claim 1, wherein playing the dynamic animation comprises:
   playing a limited motion animation in which at least one of the location and the direction of the determined object is restrictively changed according to a set constraint, when the constraint is set to the determined object; and
   playing a free motion animation in which the location and the direction of the determined object change without constraint, when the constraint is not set to the determined object.

3. The method of claim 1, further comprising receiving the attribute information of the determined object from a network.

4. The method of claim 1, wherein confirming the attribute information of the determined object comprises determining an attribute of the determined object based on additional information of the determined object.

5. The method of claim 4, wherein determining the attribute of the determined object comprises determining a physical attribute of the determined object as one of a rigid body having a shape and size that does not change when an external force is applied to the rigid body, a deformable body whose shape or size changes when the external force is applied to the deformable body, and a fluid whose shape or size changes when the external force is applied to the fluid.

6. The method of claim 1, wherein confirming the attribute information of the determined object comprises confirming the attribute information of the determined object from a memory.

7. The method of claim 6, further comprising changing the attribute information stored in the memory.

8. The method of claim 1, wherein the interaction event comprises input information of a user input from a touch screen, a sensor, or a microphone.

9. An apparatus for playing an animation in a mobile terminal, the apparatus comprising:
   a radio frequency communication unit configured to connect with a network;
   a display unit; and
   a controller configured to:
      receive a document from the radio frequency communication unit,
      in response to receiving the document, control the display unit to display at least a portion of the document, and determine at least one of a plurality of contents included in the displayed at least the portion of the document as an object of an animation, and without animating at least one content which is not determined as an object of the animation, play an animation of the determined object when an interaction event occurs while displaying the at least the portion of the document, wherein, to play the animation of the determined object, the controller is further configured to:

confirm attribute information of the determined object;

play a dynamic animation in which at least one of a location and a direction of the determined object is changed, when the attribute information indicates that the determined object is dynamically set; and play a static animation in which the location and the direction of the determined object remain constant, when the attribute information indicates that the determined object is statically set.

10. The apparatus of claim 9, wherein the controller is further configured to play a limited motion animation in which at least one of the location and the direction of the determined object is restrictively changed according to the set constraint, when a constraint is set to the determined object, and play a free motion animation in which the location and the direction of the determined object are changed without constraint, when the constraint is not set to the determined object.

11. The apparatus of claim 9, further comprising at least one of a touch screen, a sensor, and a microphone to receive the interaction event.

12. The apparatus of claim 11, wherein the controller is further configured to play the animation of the determined object in response to information received from the at least one of the touch screen, the sensor, and the microphone.

13. The apparatus of claim 12, wherein the controller is further configured to play the animation of the determined object in response to only information received from the at least one of the touch screen, the sensor, and the microphone, which is allowed for playback of the animation.

* * * * *